No. 884,562. PATENTED APR. 14, 1908.
F. A. BRAGG.
TIRE CONSTRUCTION.
APPLICATION FILED SEPT. 10, 1906.

Witnesses:
H. L. Sprague
H. W. Bown

Inventor:
Frederick A. Bragg.
by Chapin & Co.
Attorneys.

UNITED STATES PATENT OFFICE.

FREDERICK A. BRAGG, OF SPRINGFIELD, MASSACHUSETTS, ASSIGNOR, BY DIRECT AND MESNE ASSIGNMENTS, OF ONE-HALF TO DANIEL J. BROWN, OF SPRINGFIELD, MASSACHUSETTS.

TIRE CONSTRUCTION.

No. 884,562.  Specification of Letters Patent.  Patented April 14, 1908.

Application filed September 10, 1906. Serial No. 333,975.

*To all whom it may concern:*

Be it known that I, FREDERICK A. BRAGG, a citizen of the United States of America, residing at Springfield, in the county of Hampden and State of Massachusetts, have invented new and useful Improvements in Tire Constructions, of which the following is a specification.

This invention relates to improvements in tires and particularly to inflatable clencher double tube tires of the type used on automobiles at the present time.

The objects of the invention are to provide a tire that is more durable in its lasting qualities, to reduce the cost of manufacture, and to provide one that is rendered practically puncture-proof.

With these objects in view my invention, broadly, consists in superimposing a series of layers, each layer having a rubber core and a fabric backing on each side of the same, the layers being so constructed and arranged that there are a greater number of them on the tread portion than at the base portion of the tire. After the layers are assembled they are quilted or stitched together with a strong thread that has previously been saturated with a rubber solution or the like. The whole is then vulcanized into a solid mass in the ordinary manner.

Figure 1:
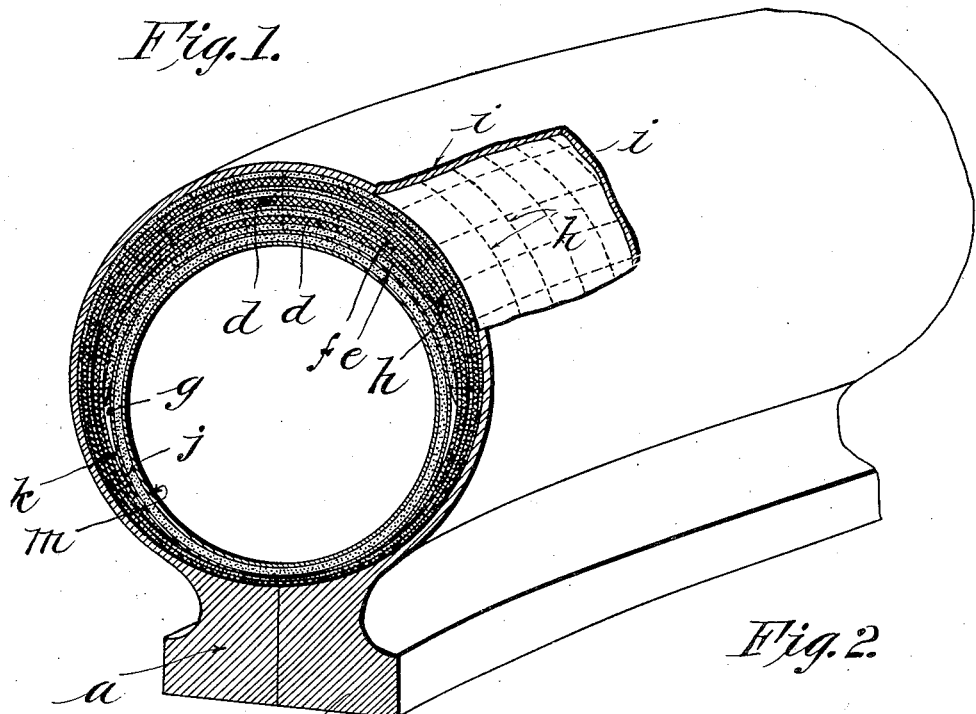
Figure 2:
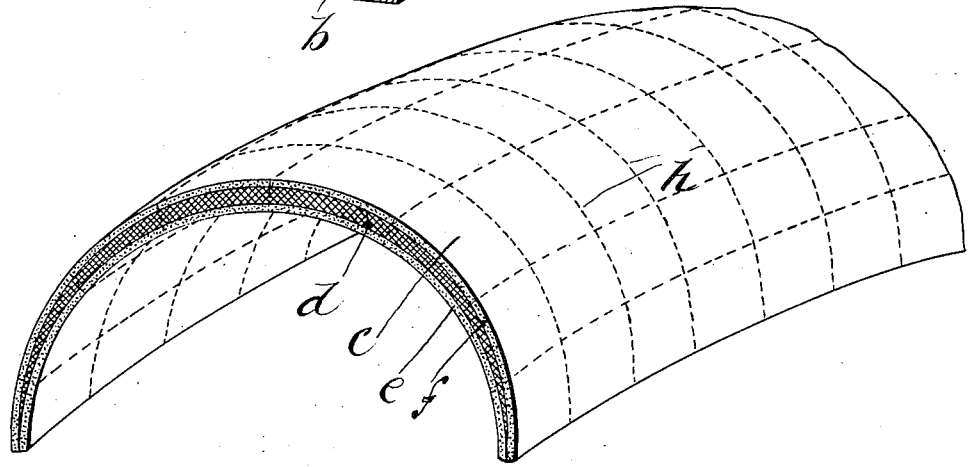

In the drawings forming part of this application,—Figure 1 is a perspective view of a portion of my improved tire construction showing in section the manner of arranging the superposed layers and the manner in which the same are quilted together. Fig. 2 is a detail view of one of the layers showing the core of the rubber and the canvas or fabric backing.

In detail, *a* and *b*, referring to the drawings, designate the base portion of the tire and in the style of type known as the clencher double tube detachable kind; *c* designates as a whole one of the layers or elements composing the tire, this layer being made up of a core *d* of raw rubber, and on one or both sides of this core is placed a canvas or fabric backing designated at *e* and *f*. The core *d*, it will be noticed, is of greater thickness at its middle portion and thinner at its edge portion.

Several of the layers are arranged in the manner shown in Fig. 1 but with the ends of the same gradually receding from the dividing line of the base-portion, as indicated by the reference letter *g*. By arranging the layers as shown in Fig. 1, a tread portion can be obtained of great thickness and strength. After the layers are assembled they are quilted or stitched together in the manner indicated by the series of dotted lines *h*, the stitches in Fig. 1 being shown very much enlarged.

The thread that is employed for quilting together the various layers is first thoroughly saturated or impregnated with a rubber solution. When the layers are quilted together, a casing of rubber, indicated at *i*, is placed on the outer surface of the assembled and quilted layers. The next step in the process of manufacture is in thoroughly vulcanizing the whole together, which process produces a thorough chemical and permonent union between the raw rubber cores *d* and the thread *h* which has been previously saturated with a rubber solution or the like, as stated. At the same time the outer casing *i* is vulcanized and united with the outward layer. I also provide an inner tube for the completed tire composed of an elastic fabric core *j*, and a layer of rubber on both sides of the same, as designated at *k* and *m*, and vulcanized onto the elastic fabric *j*. This form of inner tube is much more durable than the kind now in use, which is composed of pure rubber only.

It will be understood that I have produced a tire that is very strong in its make up by reason of the quilting threads being previously saturated, before the quilting occurs, with a rubber solution, and before the tire is vulcanized. This feature I consider the important part of my invention.

What I claim, is:—

1. In a tire construction, a series of layers composing the tread portion, said layers including a rubber core and quilted by threads saturated with a rubber solution.

2. A tire comprising a series of layers for the tread portion, said layers having a rubber core, the layers being secured together by quilting, as described.

3. A tire comprising a thickened tread portion composed of layers of rubber and fabric secured to each other by stitching, the stitching thread being chemically and permanently united to the layers after vulcanization of the same.

4. A tire having the tread portion thereof composed of a series of superposed elements, said elements having a rubber core and a canvas backing on each side of the core, the superposed elements being united to each other by quilting, the threads for the same having been saturated with a rubber solution or the like, an outer casing, whereby when the whole is vulcanized, the threads are chemically united to the core of the series of elements composing the tread portion.

5. A resilient tire consisting of superposed layers of flexible material and rubber stitched together by stitching material impregnated with a rubber solution.

6. A resilient tire consisting of superposed layers of an impervious flexible fabric attached together by stitching, the threads being saturated with a rubber solution.

7. A resilient tire consisting of superposed layers of flexible material and rubber, and a thread passed through and through said layers to sew them together, and means to make the thread permanently adherent to the tire body in the finished tire.

8. A resilient tire consisting of superposed layers of flexible material and rubber, the rubber constituting in the finished tire a binding element to unite said layers of flexible material, in combination with a cord passed through the body of the tire transversely and adherent thereto, to constitute auxiliary flexible binding means for said layers of material.

9. A resilient tire consisting of superposed layers of canvas, and rubber stitched together by a thread or cord to hold the layers against movement one relative to the other, when in use, and means to effect the adhesion of the thread to the tire body.

10. A resilient tire consisting of superposed layers of flexible material and rubber, and a thread permeated with a rubber solution passed through and through said layers to sew them together, said rubber solution effecting permanent adhesion of the thread to the tire body.

11. An improvement in the art of making pneumatic tires which consists in assembling layers of fabric and raw rubber until a tire body of suitable thickness is obtained, then securing the whole together by quilting, the quilting threads having previously been saturated with a rubber solution, whereby when the stitched tire body is vulcanized the quilting threads thereof will be rendered permanently adherent to the tire body, as described.

FREDERICK A. BRAGG.

Witnesses:
K. I. CLEMONS,
H. A. CHAPIN.